(12) United States Patent
Einecke et al.

(10) Patent No.: US 9,127,956 B2
(45) Date of Patent: Sep. 8, 2015

(54) TECHNIQUE FOR LANE ASSIGNMENT IN A VEHICLE

(71) Applicant: HONDA RESEARCH INSTITUTE EUROPE GMBH, Offenbach/Main (DE)

(72) Inventors: Nils Einecke, Offenbach (DE); Sven Rebhan, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 14/325,476

(22) Filed: Jul. 8, 2014

(65) Prior Publication Data

US 2015/0025789 A1 Jan. 22, 2015

(30) Foreign Application Priority Data

Jul. 16, 2013 (EP) ..................................... 13176640

(51) Int. Cl.
*G01C 21/30* (2006.01)
*G01C 21/32* (2006.01)
*G01C 21/34* (2006.01)
*B60W 40/04* (2006.01)
*G01S 13/93* (2006.01)
*G01S 13/72* (2006.01)

(52) U.S. Cl.
CPC .............. *G01C 21/34* (2013.01); *B60W 40/04* (2013.01); *G01S 13/72* (2013.01); *G01S 13/931* (2013.01); *B60W 2420/52* (2013.01); *B60W 2530/14* (2013.01); *B60W 2550/306* (2013.01); *B60W 2550/408* (2013.01); *G01S 2013/936* (2013.01)

(58) Field of Classification Search
USPC ........................................................... 701/49
See application file for complete search history.

(56) References Cited

U.S. PATENT DOCUMENTS 6,265,991 B1 7/2001 Nishiwaki et al.
2003/0225519 A1* 12/2003 Miyahara ...................... 701/301

FOREIGN PATENT DOCUMENTS

| DE | 19749086 C1 | 8/1999 |
|----|----|----|
| DE | 102010023196 A1 | 12/2011 |
| DE | 102011080922 A1 | 2/2013 |
| EP | 1193661 A1 | 4/2002 |
| WO | WO 01/94970 A1 | 12/2001 |

OTHER PUBLICATIONS

European Search Report dated Dec. 10, 2013 corresponding to European Patent Application No. 13176640.4.

(Continued)

*Primary Examiner* — Maceeh Anwari
(74) *Attorney, Agent, or Firm* — Squire Patton Boggs (US) LLP

(57) ABSTRACT

A technique for assigning lanes on a road to objects moving in a vicinity of a vehicle on the road is proposed. A method embodiment of the invention comprises the steps of providing trajectories, wherein the or each trajectory represents a time sequence of positions of a moving object; selecting first and second objects and determining a distance between a current position of the first object and the trajectory of the second object; comparing the distance with a predefined threshold; and providing, based on a result of the comparison, a lane assignment indicating a lane to which the second object is assigned.

16 Claims, 11 Drawing Sheets

(56) References Cited

OTHER PUBLICATIONS

Urban Meis et al., "A New Method for Robust Far-Distance Road Course Estimation in Advanced Driver Assistance Systems," 2010 13th International IEEE, Annual Conference on Intelligent Transportation Systems, TC4.5, Madeira Island, Portugal, Sep. 19-22, 2010, pp. 1357-1362.

Christian Adam et al., "Probabilistic Road Estimation and Lane Association Using Radar Detections," 14th International Conference on Information Fusion, Chicago, Illinois, Jul. 5-8, 2011, pp. 937-944.

\* cited by examiner

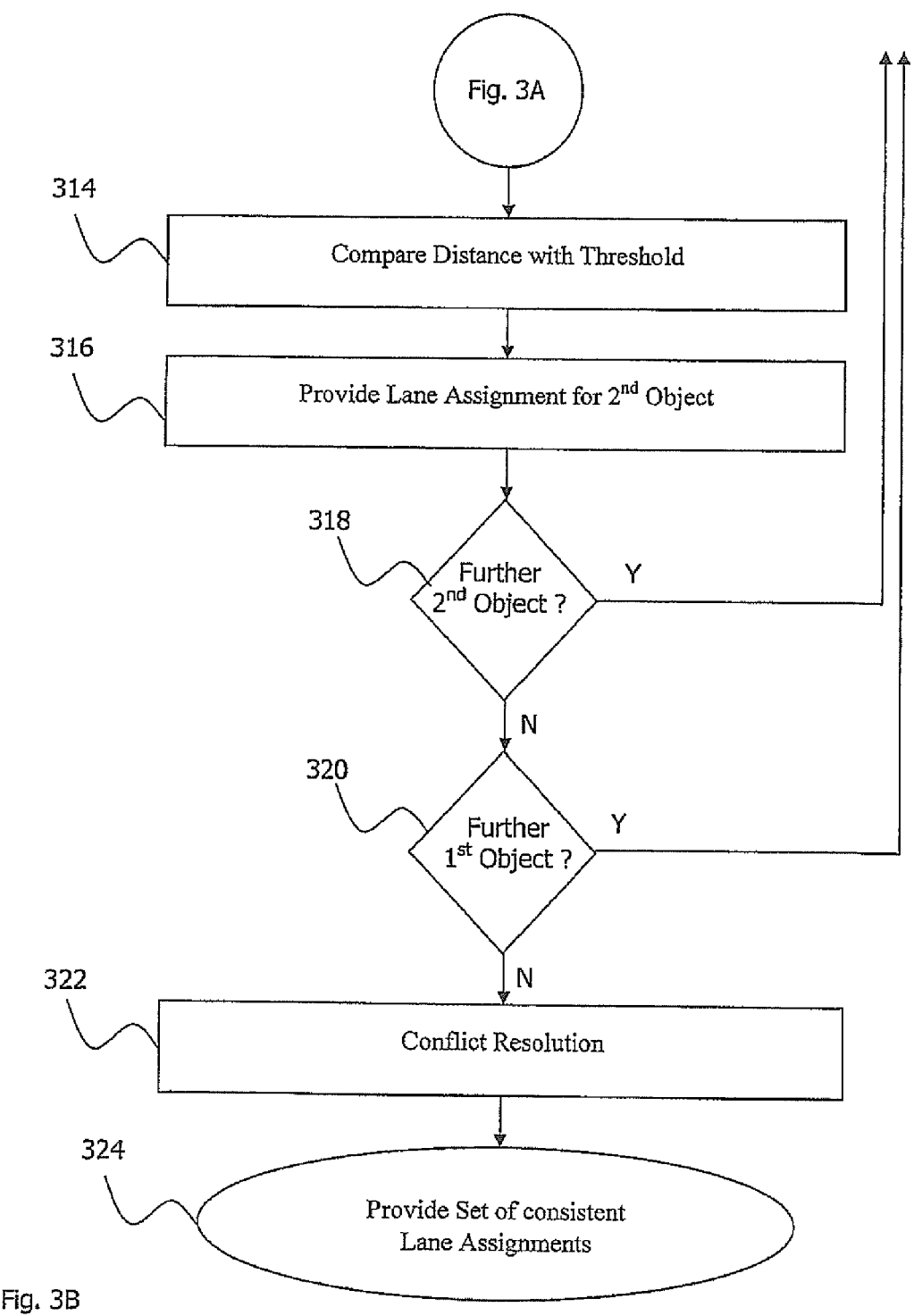

TECHNIQUE FOR LANE ASSIGNMENT IN A VEHICLE

The present invention relates to techniques for assisting a driver in a vehicle, and in particular to a method and system for assigning lanes on a road to objects moving in a vicinity of the vehicle.

A manifold of driving assistance systems is available today which aim at increasing comfort and/or safety of the passengers of a vehicle. Systems related to driving or manoeuvring are based on sensing equipment such as short range active systems including ultrasonic systems, long range active systems including radar, lidar, or infra-red, passive systems such as cameras, and/or may make use of Car2X communication including vehicle-to-vehicle communication and/or communication between vehicle and roadside units, which may be based on mobile network communication or other wireless network communication systems such as Wireless LAN.

Functions related to driving or manoeuvring range from distance sensing and passive or active parking assistance to sophisticated "Advanced Driver Assistant Systems" (ADAS) such as, for example, cruise-control functions, e.g. "Intelligent Adaptive Cruise Control" (IACC), which may include a detection of other vehicles or objects moving in front or behind the ego-vehicle, and may include even functions for predicting a future behaviour of neighboring objects, e.g. lane change. ADAS functions may also relate to collision mitigation, emergency braking, etc., or may include lane change assistants, which need to be able at first instance to determine whether there is more than one lane available and if so, how many.

Many ADAS functions rely on assigning previously detected objects or road users to one of multiple lanes. A correct assignment of objects to lanes is crucial for systems such as cruise-control, collision avoidance/mitigation or emergency breaking, as the operation depends on the detected object's lane, for example whether or not it is the ego-lane.

Conventional approaches for lane assignment may use lane position information for assigning vehicles to different lanes. A lane assignment is preceded by a lane marking detection using, e.g., camera or other image data. The lane marking lines are extracted from the image data. Then the positions of other road users as detected by, e.g., radar is mapped to the image domain and compared with the extracted lane marking positions in order to assign the lanes to the users.

More specifically, the road course is detected and the lane offset is calculated dependent on the current position of the road user and the "position" of the road at the distance of the road user. This approach requires a separate detection or determination of (1) lane position information and (2) position information of the road user/s. The lane position information may be gathered from a camera providing image data, which is then to be analyzed for identifying a lane or lanes, for example by detecting lane marking lines in white and/or other colors. The object position/s may be determined independently by radar, lidar, and/or Car2X. A processing of the data may then comprise mapping object positions to road positions/lanes, which includes determining a road position at an object position. Eventually, a lane assignment of objects to lanes may be provided to other functions of the vehicle assistant and/or output to the driver.

EP 1 193 661 A1 describes a lane recognition apparatus for a vehicle, which is based on camera images.

DE 197 49 086 C1 describes an apparatus for determining data indicating traffic lane evolution. Information of a camera-based lane recognition system is combined with radar-based position data related to other road users ahead of the ego-vehicle. The course of the road is estimated. Then the position of the other vehicles is determined with respect to the ego-lane, i.e. the lane of the ego-vehicle.

The above-described systems are expensive, as they require various sensor systems, for example at least one camera for road detection and at least one radar for object detection. For cost-limiting reasons, the data processing should be robust enough to be based on a simple camera or simple radar system. However, a camera-based road course/lane estimation turns out to be error-prone because of, for example, bad visibility conditions due to fog, rain, darkness, etc. Radar detection accuracy is limited by noise in a lateral position estimation, for example, and the various error sources add together such that an available precision is limited. It is also to be noted that the applicability of the methods is normally limited by the limited camera range which may be considerably smaller than an object detection range. Therefore there is a general need to improve on these methods of lane assignment.

Meis et al., "A New Method for Robust Far-distance Road Course Estimation in Advanced Driver Assistance Systems", 13th International IEEE Conference on Intelligent Transportation Systems (ITSC), 19-22 Sep. 2010, Funchal, p. 1357-1362, ISBN: 978-1-4244-7657-2, describe an improvement on lane detection by means of combining video data and radar data using a Kalman filter. From the radar data static targets at the road boundary are extracted (e.g. bushes, crash barriers, road posts). Fusing video and radar data enables a higher precision in particular in poor visibility conditions due to, e.g., fog.

Other known approaches of lane assignment use only radar data to assign road users to the ego-lane, i.e. on the same lane as the ego-vehicle. Such systems uses available radar data such as positions and velocities of detected objects to determine static targets and then estimate a road course based on the determined static targets. An at least simple lane model is required that may, for example, be derived from the steering angle of the ego-vehicle. However, such simple model this is prone to fail especially when the road changes from curved to straight. More sophisticated models may require map data to be available for determining a number of lanes.

Adam, C. et al., "Probabilistic Road Estimation and Lane Association Using Radar Detections", Proceedings of the 14th International Conference on Information Fusion, 5-8 Jul. 2011, Chicago, Ill., USA, p. 1-8, ISBN: 978-1-4577-0267-9, describe a probabilistic way of estimating the road course and a lane association using only radar information. First, the static targets are extracted to estimate the road boundary and its shape. Afterwards, the dynamic obstacles on the road are analyzed in order to assign each to a lane. For doing so map data is required in order to get the number of existing lanes. Then for each road user a probability for each lane is calculated. This probability indicates how likely it is that a road user is on a particular lane. For calculating the probabilities information such as position, velocity, heading direction, yaw rate from the radar is used.

DE 10 2010 023 196 A1 discloses a technique in the field of Adaptive Cruise Control (ACC). The method is directed to detecting a predecessor vehicle on the ego-lane by means of only radar data. In order to determine whether a vehicle drives in front of the ego-vehicle a position of the other vehicle is stored at a particular point in time. In succeeding time steps, the distance of the current position of the ego-vehicle and the stored position of the other vehicle is evaluated. If the distance between the stored position of the other vehicle and the ego-vehicle falls below a given threshold than the other vehicle is classified to be on the same lane as the ego-vehicle, i.e. it is a predecessor on the ego-lane. Multiple instances of the method may run in parallel in order to accelerate detection of a change of the predecessor.

The above-described approaches using only radar as the sensor input either require additional complex data input such as map data indicating a number of lanes, or can only assign a car to be the predecessor in the ego-lane. However, such input is not sufficient for many ADAS functions and therefore has limited applicability only.

There is a need for a cost-efficient technique for lane assignment which operates reliably under a wide range of conditions such as fog, rain, darkness, and is of general applicability for various ADAS functions.

The above need is satisfied by a method of lane assignment in a vehicle. The method comprises the steps of providing one or more trajectories, wherein the or each trajectory represents a time sequence of positions of a moving object; selecting one first object from the one or more moving objects and the vehicle, wherein a first lane assignment indicates a lane to which the first object is assigned; selecting one second object from the one or more moving objects; determining a distance between a current position of the first object and the trajectory of the second object; comparing the distance with a pre-defined threshold; and providing, based on the first lane assignment and a result of the comparison, a second lane assignment indicating a lane to which the second object is assigned.

The vehicle (ego-vehicle) may be a car, truck, or bus, or in general any object intended for driving on a road, motorway, etc., which may include manned vehicles driven by a driver but also automatically driven vehicles such as robot vehicles. Similarly, the moving objects may include any kind of vehicles, cars, trucks, busses, motor/cyclists, but also trolleys, pedestrians, and even animals such as horses.

The trajectories of the moving objects may be updated according to a measurement or sensing frequency (or less). Typically, an update frequency may be in the range of 1-10 Hertz. Lane assignments may be updated with the same frequency or less. A trajectory may represent measured or detected positions of a moving object for a time of, for example, several seconds, e.g. 5 seconds.

Embodiments of the method may include the further step of accepting object data indicating one or more object positions as detected by a sensor equipment such as a ranging system of the vehicle and/or provided by a Car2X environment. The ranging system may be a long-range system such as an active or passive long-range system including, for example, at least one of a radar system and a lidar system.

In order to connect to a Car2X environment, the vehicle may comprise wireless communication equipment such as an antenna, a mobile communications receiver, etc.

The method may comprise the further step of evaluating if a detected object is a moving object or a static object. Such evaluation may be based, for example, on velocity data included in the object-related data provided by the sensor equipment of the vehicle data.

Embodiments of the method may comprise the further step of calculating one or more lane assignments based on image data of a camera. Some of these embodiments may comprise the further step of accepting data indicating a road lane shape from a camera associated with the vehicle.

The step of determining the distance between the current position of the first object and the trajectory of the second object may comprise determining at least one of a lateral distance and an euclidian distance between the current position of the first object and the trajectory of the second object.

The predefined threshold may represent at least one of a lane width, for example a width as defined according to statutory regulations, for example for one or more different types of roads, and a vehicle width, for example an average vehicle width, e.g. an average width of a car or truck. Corresponding data may be provided to a system for lane assignment on manufacture and/or during inspection.

According to embodiments of the method, the second lane assignment may be provided to indicate, in case the determined distance is below the threshold, the same lane as indicated by the first lane assignment. Additionally or alternatively, in case the determined distance is above the threshold, the method may comprise the further steps of determining a lateral position of the second object relative to the vehicle, and providing the second lane assignment to indicate a lane to the left or right of the lane to which the vehicle is assigned.

Lane assignments may indicates a lane based on a position of the lane relative to another lane. According to various embodiments, a relative lane assignment may be based on a lane assignment for the (ego-)vehicle. For example, a lane assignment may indicate a lane one or two positions to the right or left of the ego-lane.

Embodiments of the method may comprise the further steps of determining a current forward distance, such as a depth or a z-distance, of the first object from the vehicle; and determining trajectories available at or for the determined current forward distance. Generally, a trajectory may be determined to be an 'available trajectory' with respect to the current position of the first object in case it is possible to determine a distance between the current position of the first object and the trajectory. For example, in case the distance is calculated as an Euclidian distance in an (x, z) coordinate system, the trajectory may not necessarily reach back to the current forward distance (z-value) of the first object, but the z-value of the end of the trajectory (the oldest position in the position history) may be larger than the z-value of the first object.

The step of selecting the second object may then comprise selecting an object associated with one of the determined available trajectories. Various embodiments may comprise the step of determining a relation list indicating objects with available trajectories for each of the one or more moving objects and the vehicle.

According to various embodiments, a method according to the invention may comprise the further steps of building a relation graph representing relations between pairs of moving objects, including determining trajectories which have to be considered for building the relation graph, wherein a trajectory of a second object has to be considered if a distance between this trajectory and the trajectory of a first object is below a pre-determined threshold, and a relation between the first and the second object is defined if the trajectory has to be considered; and propagating lane assignments along the determined relation graph, including determining distances ($d\_1$, $d\_2$, $d\_3$) between pairs of moving objects having a relation with each other, and inferring lane assignments for the moving objects by assigning a lane to a second object of a pair of moving objects according to a lane assignment for the first object of the pair of moving objects and the determined distance for that pair of moving objects.

According to some of these embodiments, a trajectory has to be considered for building the relation graph if a line projected perpendicular to the driving direction of a first object at a current position of a first object intersects with a trajectory of a second object.

The method may comprise the further steps of comparing multiple lane assignments for one and the same object; and selectively performing a correction or conflict resolution process based on a result of the comparison indicating conflicting lane assignments. The conflict resolution process may comprise the steps of providing a modified relation list by removing one object from the object with the conflicting lane assignments and the objects related to the object with the conflicting lane assignments from the relation list; and re-determining the lane assignments based on the modified relation list. According to some embodiments, a related object with the least number of relations may be removed from the relation list.

When looping through the list of detected moving objects including the ego-vehicle for the list of first objects, the first and/or second objects may be selected in a depth-first-search or breath-first-search.

The method may include as a by-product the determination of number of lanes available in total or populated by the detected objects. The total number of lanes may be indicated to a driver of the vehicle, for example the lanes of the road may be schematically indicated on a display.

The above-indicated need is further satisfied by a computer program product comprising program code portions for performing the method according to any one of the methods and method aspects outlined above or elsewhere herein, when the computer program product is executed on a computing device, for example one or more electronic processing modules of a vehicle. The computer program product may be stored on a computer readable recording medium, such as a permanent or re-writeable memory within or associated with a computing device or a removable CD-ROM, DVD or USB-stick. Additionally or alternatively, the computer program product may be provided for download to a computing device, for example via a data network such as the Internet or a communication line such as a telephone line or wireless link.

The above-indicated need is still further satisfied by a system for assisting a driver in a vehicle. The system may be equipped with software, firmware, and/or hardware to perform a lane assignment according to the invention. The system may comprise: a component adapted to provide one or more trajectories, wherein the or each trajectory represents a time sequence of positions of a moving object; a component adapted to select one first object from the one or more moving objects and the vehicle, wherein a first lane assignment indicates a lane to which the first object is assigned; a component adapted to select one second object from the one or more moving objects; a component adapted to determine a distance between a current position of the first object and the trajectory of the second object; a component adapted to compare the distance with a predefined threshold; and a component adapted to provide, based on the first lane assignment and a result of the comparison, a second lane assignment indicating a lane to which the second object is assigned.

The above-indicated need is also satisfied by a vehicle, which comprises a system as outlined above or elsewhere herein.

According to one aspect, the invention may be interpreted as comprising a technique for performing a lane assignment to a road user based on position data only, wherein the position data is provided by a long-range system such as radar or lidar, and/or by a Car2X environment. To this end, movement trajectories of at least one road user are determined, i.e. according to this aspect of the invention not only current position data are used, but also position data from the past (position history) are used, e.g. up to 5 seconds back. These trajectories are then used for assigning road users to lanes. For example, for a given timepoint, current positions of a moving object are compared to the trajectories of the other moving objects, if available at the depth of the object under consideration (which may be the ego-vehicle), and lane assignments may be performed according to one or more of such comparisons.

The invention provides an approach for lane assignment based on only ranging data such as provided by radar or lidar. A separate data source for lane detection, such as provided by camera images, is not necessarily required. Therefore, a lane assignment can be performed without a specific determination of road course or lane estimation. Instead, an estimation of the number of lanes can be provided as a by-product of the invention.

As a specific or separate road course estimation is dispensable, no camera or similar imaging system is required and the invention can be applied for vehicles without a camera or other imaging system. Accordingly, the inventive method is independent of weather conditions such as fog, rain, or darkness which deteriorate the results of conventional methods of lane assignment. As the invention may rest only on data of a comparatively long-ranging system such as radar, the results may be more reliable and may also reach longer in a forward and/or backward direction of the ego-vehicle.

At the same time, the invention is generally applicable for many driving assistant functions such as "Intelligent Adaptive Cruise Control" (IACC), as it provides lane assignments not only for one object moving in front of the ego-vehicle and/or for the ego-lane, but can provide lane assignments for any detected moving object and multiple lanes to the left and right of the ego-lane. For example an assignment to the left or the right lane is important for lane change assistant systems.

While an inventive system can be employed without any input of a camera, in vehicles including for example an imaging system, an assistant function according to the invention can be provided as a substitute or complement to another lane assignment function, i.e. can be implemented as an add-on or a supplementary function, which is switched on to increase, for example, the reliability of another lane assignment function, for example in case of limited visibility conditions such as in fog, rain, snow or ice, or at night or in another situation when lane markings are not visible, for example in case of yellow instead of white markings at a construction site, a polluted road or street, etc. The inventive method can be switched on or added manually by the driver and/or automatically, e.g. in case a noise level of, e.g., an imaging system is detected to be above a predefined threshold.

Embodiments of the inventive method may comprise a step of comparing the number of detected moving objects with a given threshold number and selectively activating or de-activating the lane assignment procedure. For example for a given threshold of two, the inventive method may only be activated in case more than two moving objects are detected. In this way the application of an embodiment of the inventive technique may be limited to traffic situations which allow reliable lane assignments and/or which require lane assignments at all.

Aspects of the invention comprise comparing the positions and/or position histories of detected objects including the ego-vehicle not only with the ego-vehicle, but with each other. For example, the invention comprises the aspect of constructing a relation graph representing relations between pairs of detected objects including the ego-vehicle, wherein a first object is defined to be related to a second object if the trajectory of the second object is defined based on its position history at a depth (i.e. a forward or z-direction of the ego-vehicle) of the current position of the first object. If this is the case, lateral displacements of the first and second objects and, as a result therefrom, at least relative lane assignments of the two objects can be determined. Eventually, not only an ego-lane assignment related to a moving object directly ahead of the ego-vehicle can be determined, but general lane assignments can be determined. As a specific example, according to the invention multiple vehicles ahead or behind the ego-vehicle can be assigned to the ego-lane, for example based on a radar system which can detect up to three vehicles in front of the ego-vehicle.

In the following, the invention will further be described with reference to exemplary embodiments illustrated in the figures, in which:

FIG. 1 schematically illustrates a first exemplary traffic situation on a road with ego-vehicle and further moving objects;

FIG. 3B is a continuation of the flow diagram of FIG. 3A;

Figure 4B:
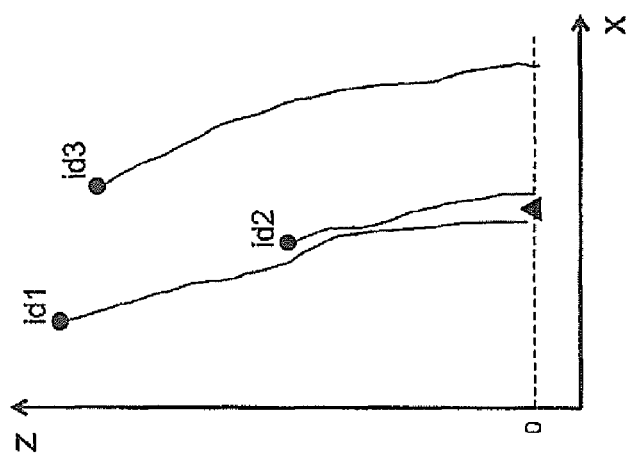
FIG. 4A illustrates the traffic situation of FIG. 1 in an exemplary coordinate system as employed by the ECU of FIG. 2.
Figure 4A:
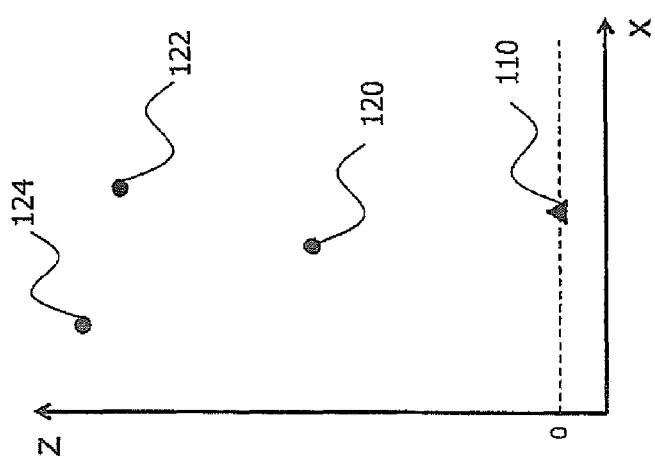
Figure 5A:
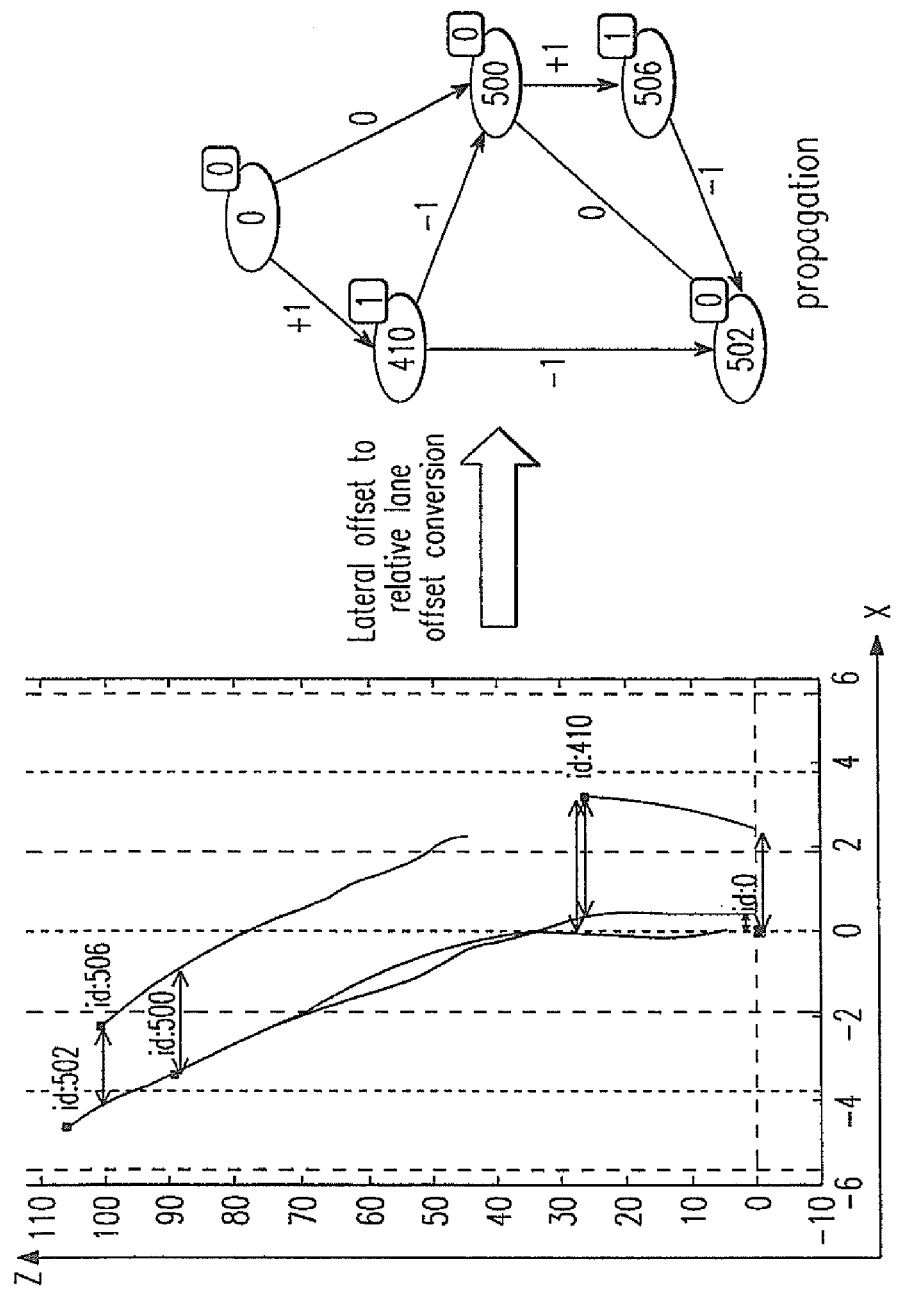
Figure 5B:
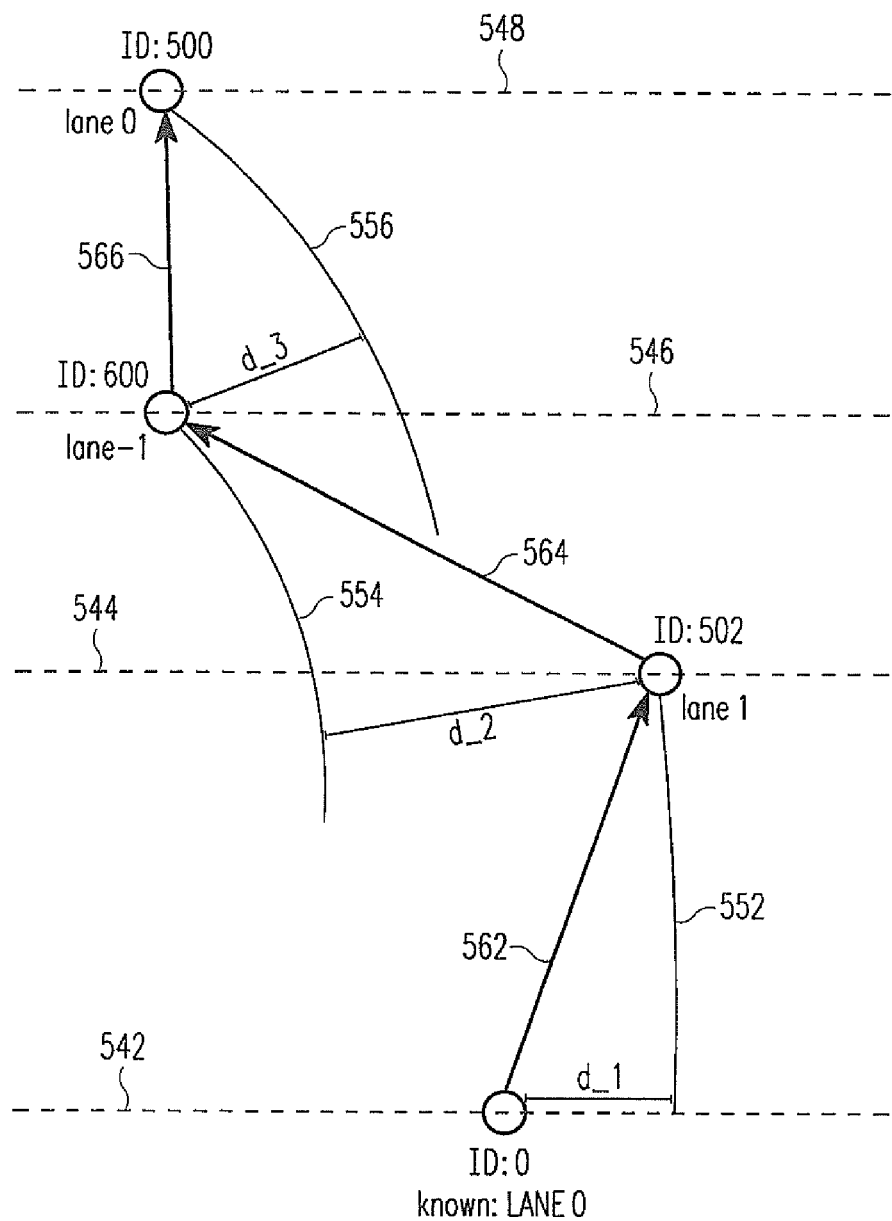
Figure 6:
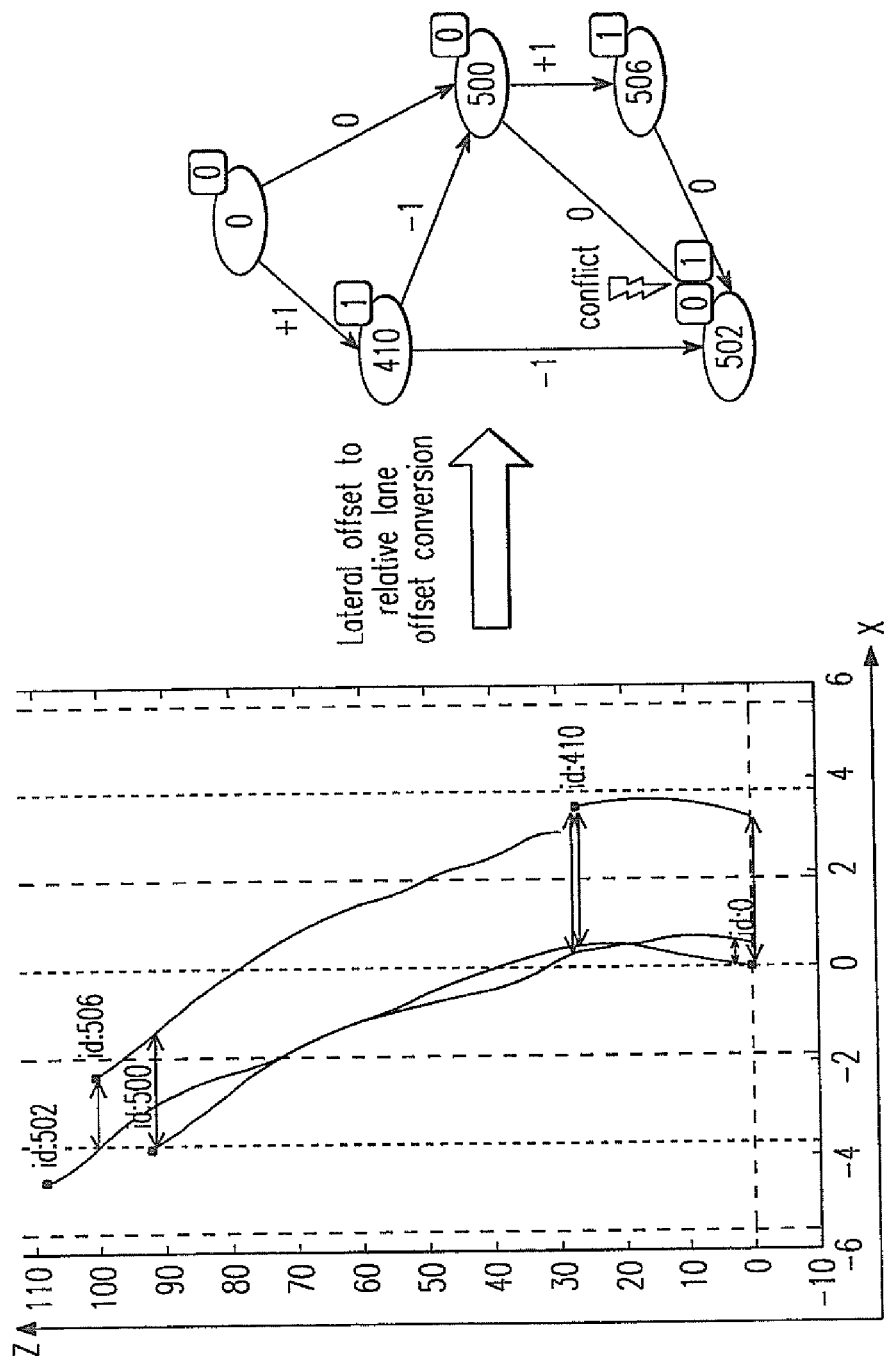
Figure 7:
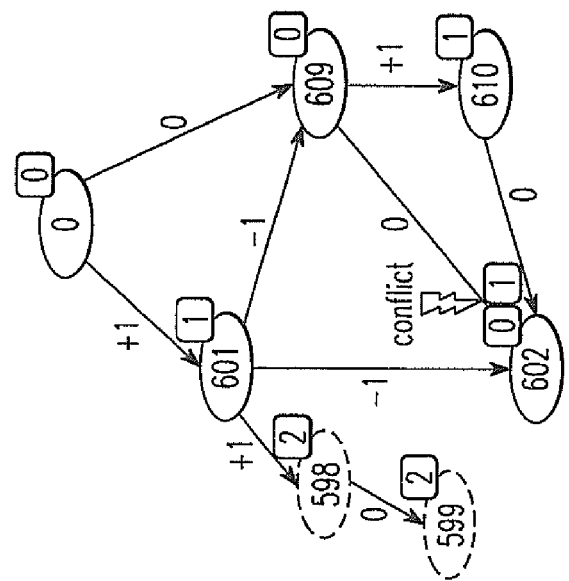
Figure 7:
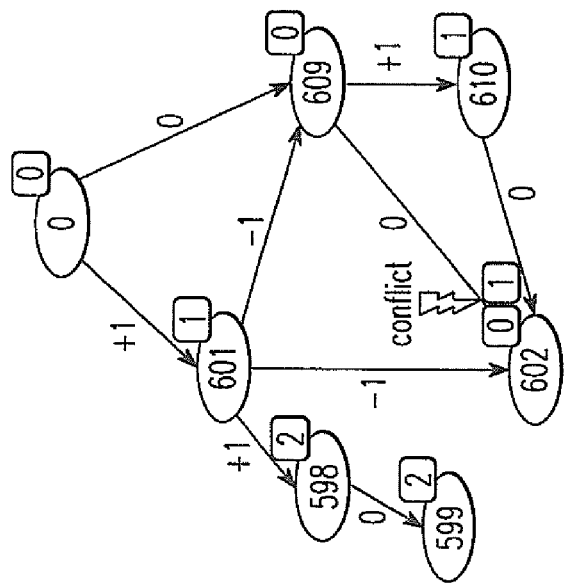
Figure 8:
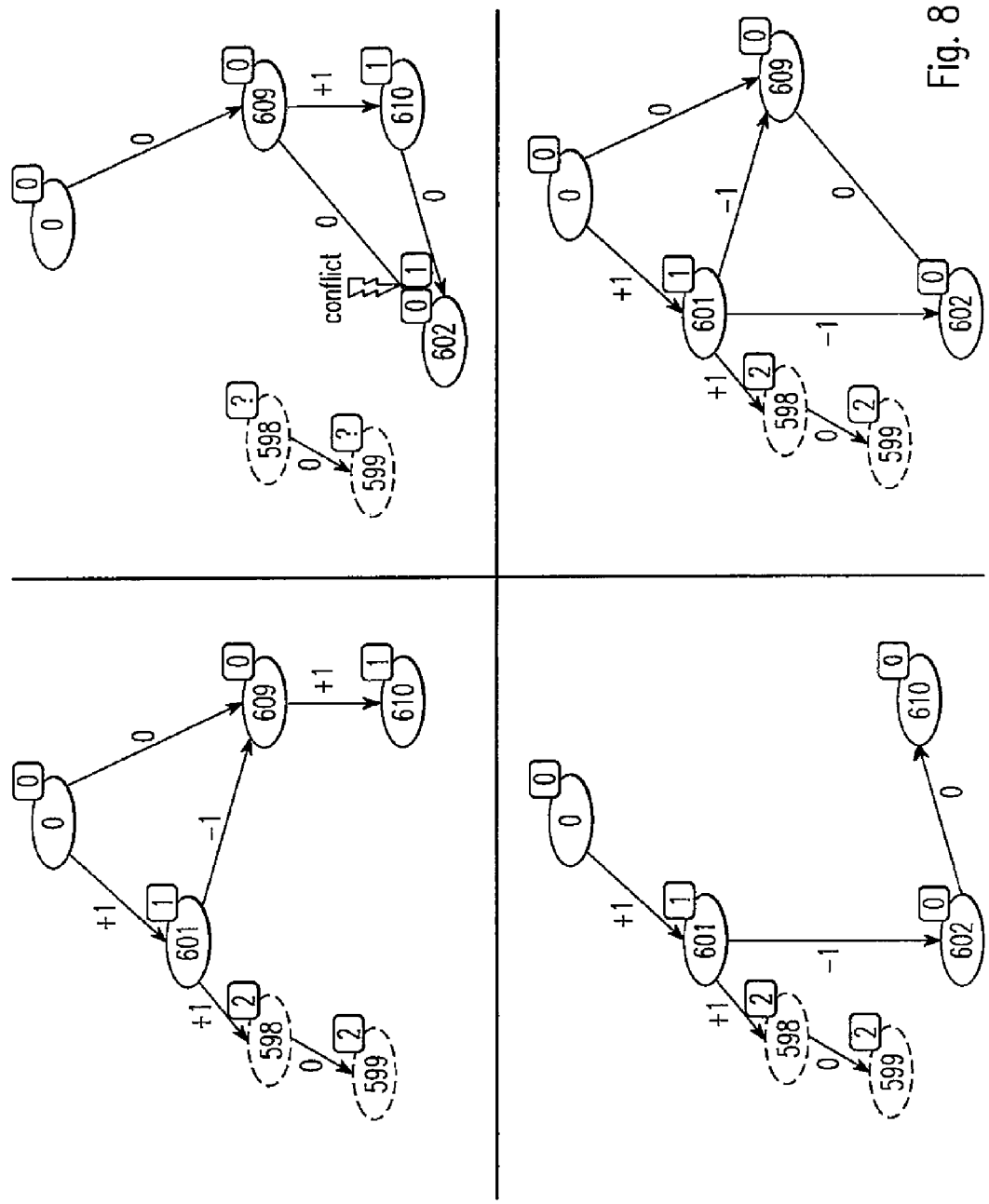
Figure 9:
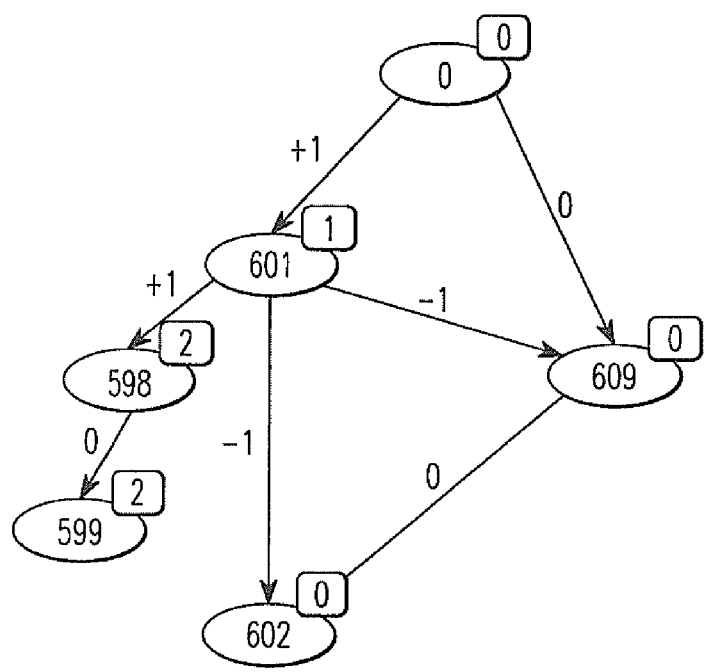

FIG. 4B schematically illustrates an aspect of the invention based on the situation of FIG. 4A;

FIG. 5A illustrates a relation graph according to the invention for a second exemplary traffic situation;

FIG. 5B illustrates a relation graph according to the invention for a third exemplary traffic situation;

FIG. 6 illustrates a relation graph according to the invention for a fourth exemplary traffic situation;

FIG. 7 illustrates relation graphs according to the invention for a fifth exemplary traffic situation;

FIG. 8 illustrates four intermediate relation graphs according to the invention for the fifth traffic situation; and FIG. 9 illustrates a final relation graph with resolved conflict according to the invention for the fifth exemplary traffic situation.

Figure 1:
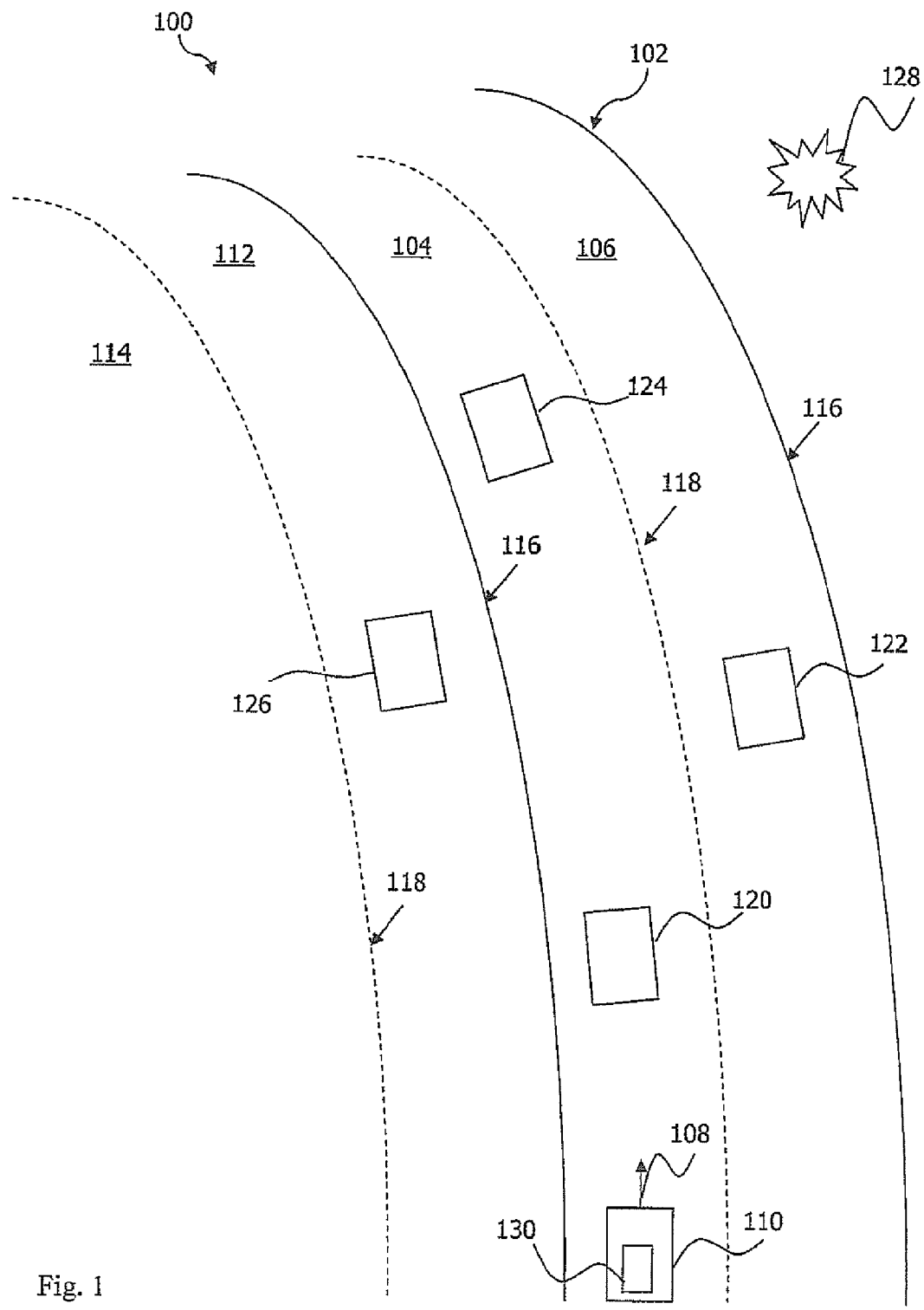

FIG. 1 illustrates a traffic situation 100 on a road 102 which will be used as a reference for describing aspects of the invention below. The road 102 comprises two lanes 104, 106 in a direction of travel 108 of ego-vehicle 110, and may comprise further lanes 112, 114 which may be reserved for opposing traffic. The lanes are marked by continuous 116 and broken 118 marking lines. Ahead of the ego-vehicle 110 there is further traffic represented by moving objects (in this case, further cars or vehicles) 120, 122, 124. Further traffic may follow ego-vehicle 110 but is omitted in FIG. 1 purely for reasons of conciseness. Opposing traffic is exemplarily represented by a vehicle 126. One or more static objects 128 nearby to road 100 may comprise trees, walls or buildings, parking vehicles, road posts, etc.

The ego-vehicle 110 is equipped with an ECU (Electronic Control Unit) 130, which may be realized in form of one or more hardware units onboard vehicle 110, onto which firmware and/or software is installed to implement one or more driving assistants for a driver of vehicle 110. It is assumed that at least one ADAS function is implemented which requires a lane assignment function, i.e. a function that assigns the detected moving objects 120 and 124 to lane 104 (the ego-lane of vehicle 110), and assigns detected moving object 122 to lane 106 (the lane right to the ego-lane).

Figure 2:
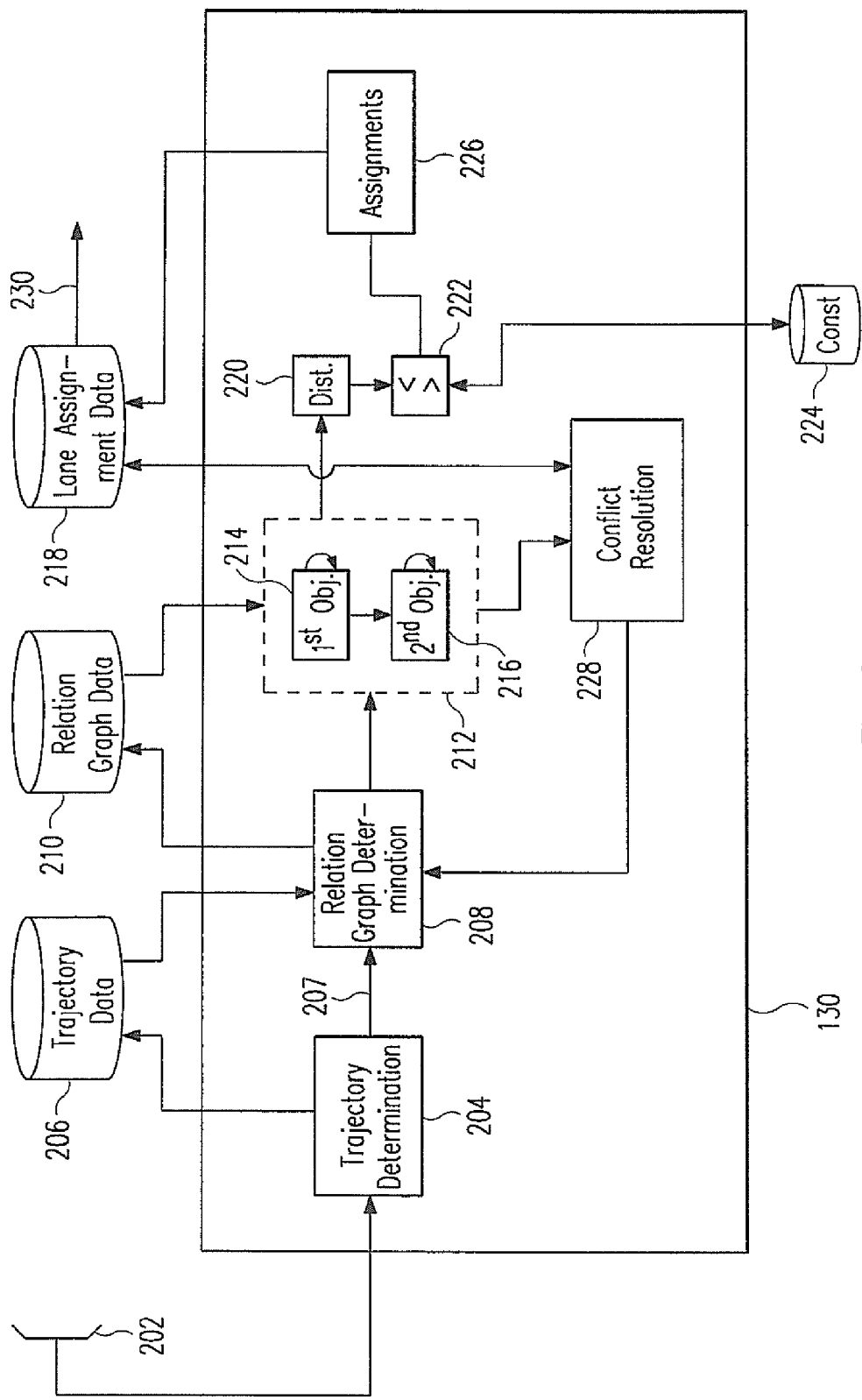
FIG. 2 illustrates functional components of an ECU of the ego-vehicle of FIG. 1.
Figure 3A:
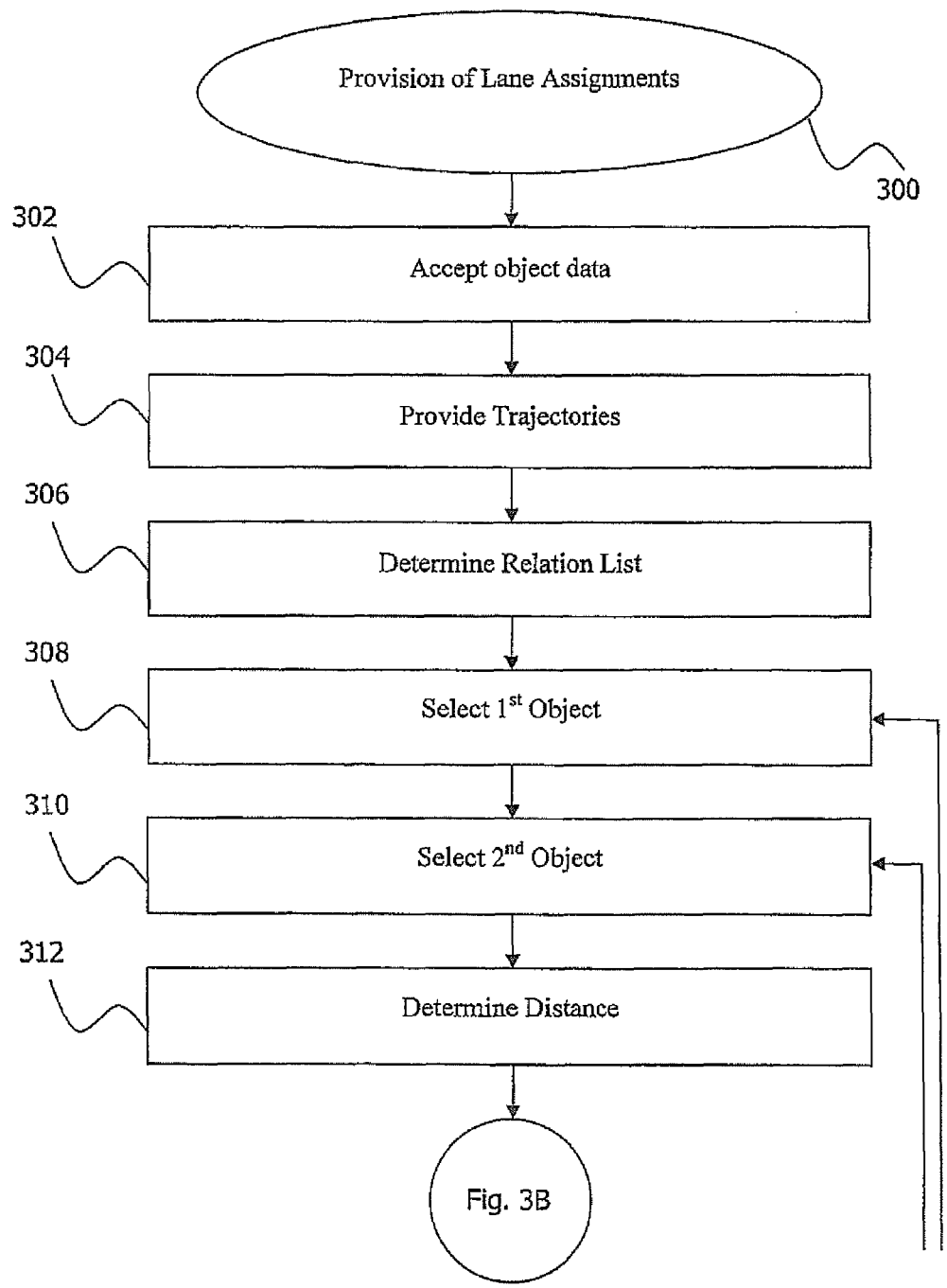
FIG. 3A is a flow diagram illustrating an operation of the ECU of FIG. 2.

FIG. 2 illustrates functional components of the ECU 130 of FIG. 1. For sake of conciseness, only those functional blocks relevant for illustrating the invention are shown FIG. 2. An operation of the ECU 130 will be described with reference to the flow diagram of FIGS. 3A, 3B. Generally, the operation 300 of the ECU 130 is described with respect to generating or updating lane assignments for moving objects detected in the environment of the vehicle 110.

In step 302, a trajectory component 204 of ECU 130 accepts object data indicating one or more object positions as detected by the radar system 202 of vehicle 110. While vehicle 110 may be equipped with various sensor circuitry, only radar 202 is illustrated in FIG. 2 as providing data to ECU 130, specifically to component 204 which is adapted to provide trajectories of objects detected by radar system 202. Each trajectory may represent a time sequence of positions of a moving object, i.e. the component 204 may operate to receive data at regular intervals from radar 202, for example with a frequency of 1 to 10 Hz. The component 204 may analyze the data to detect objects such as the objects 120, 122, 124, and 128 in FIG. 1.

The component 204 may operate prior to generating or updating trajectories in order to discriminate static object 128 from moving objects 120 to 124 based on, e.g., velocity data provided by radar 202. Generally, velocity data processed as being measured relative to the ego-vehicle in case of ranging devices such as radar and as being measured in a global coordinate system in case of a Car2X environment.

In step 304, the component 204 provides trajectories for the detected moving objects, which may include the component 204 generating, continuously updating and, e.g., cyclically overwriting a corresponding data record for each moving object in an associated storage area 206. Such data record may comprise, for example, an identifier of the detected moving object and a number of associated time stamps, wherein each time stamp in turn has data associated thereto which may comprise position data, such as an x-coordinate and a z-coordinate in terms of an ego-vehicle based coordinate system, a velocity and, if available, a relative or absolute lane identifier corresponding to earlier lane assignments. However, for sake of clarity lane assignments will be discussed as being stored separately in the following.

The trajectory component 204 triggers 207 a relation component 208 at, for example, regular time intervals which may correspond to the time points the component 204 accepts data from radar 202. The trigger 207 may also occur less frequent, for example in order to (temporarily) limit a computational burden of ECU 130. Component 208 is provided to determine in a step a 306 a relation list (relation graph) as will be discussed in detail below for indicating objects with available trajectories for each of the one or more moving objects 120, 122, 124 and the vehicle 110, wherein the relation list is stored in a storage component 210 also associated with ECU 130.

Before continuing with a detailed description of the operation of ECU 130, the general role and purpose of the trajectories and the relation list as provided at a particular point in time in storages 206, 210 will be discussed with reference to high-level examples illustrated in FIGS. 4A, 4B and 5.

FIG. 4A is a schematic illustration of the traffic situation of FIG. 1, wherein only the positions of the moving objects 120, 122, 124 shown as black dots are given as detected by the radar of ego-vehicle 110 shown as a black triangle in a birds-eye-view, i.e. in an x-z plot with coordinate z denoting a depth or forward-distance along a direction of travel of vehicle 110 and coordinate x denoting a lateral coordinate extending perpendicular to the direction of travel, as known to the skilled person. The dashed line denotes the distance zero to the ego-vehicle 110. It is apparent that based only on the positions of the three detected moving objects, the three detected road users may hardly assigned to one or more lanes. Generally, a reliable lane assignment may hardly be performed based on scarce information only, such as position information of only few objects.

FIG. 4B also refers to the exemplary traffic situation of FIG. 1, however, the traffic participants are tracked over time and corresponding trajectories are generated for each detected object from the past measurements. Therefore, in addition to the positions of the detected moving objects also their trajectories are illustrated as generated from the detected positions of these objects in previous time steps.

A tracking of the detected objects over time may be accomplished using, e.g. object identifiers as assigned by the ranging device 202 of the ego-vehicle 110 or the ECU 130 (e.g., the trajectory determination component 204). Therefore the detected objects are referenced in FIG. 4B, instead of with reference numerals 120, 122, and 124, with exemplary id-numbers id1, id2, and id3, respectively.

The trajectories of objects id1, id2 and id3 are shown as extending back to depth zero, i.e. the current position of the ego-vehicle 110; generally trajectories may end at positive z-values, e.g. in case of newly detected objects, or may end at negative z-values, i.e. behind the ego-vehicle.

Generally, a trajectory may collect position data and/or other data of a detected object for a time range of several seconds up to about one minute dependent on detection range, number of currently detected/tracked objects, relative and absolute velocities, etc. In a typical situation a trajectory may extend 5 seconds into the past.

Using position histories (i.e. trajectories) in addition to current positions of detected moving objects allows to apply a reasoning scheme in order to reliably assign the different detected objects to different lanes. For example, from the data illustrated in FIG. 4B it is clear that the road users id1 and id2 are on the same lane as the ego-vehicle 110 while the road user id3 travels on a lane to the right of the ego-vehicle 110. This also implies the lane detection that there is in fact a lane to the right of the ego-lane, which could not be inferred from only the current position data of FIG. 4A.

It is to be noted that the lane assignments and lane detection discussed above can be inferred from the current position data and position histories as depicted in FIG. 4B without any additional road shape or lane information.

FIG. 5A will be referenced below to describe on a generic or high level an exemplary technical implementation of what has been discussed with reference to FIG. 4B. FIG. 5A illustrates an instance of a radar detection (left portion of the figure) and how the inference for lane assignment may take place (relation graph depicted in the right portion of the figure). The traffic situation is no longer that of FIG. 1 for the sake of discussion.

The interrelations between the ego-vehicle id:0 and the other detected road users with ids:410, 500, 502, and 506 and their trajectories spans a relation graph wherein the road users form the nodes and the links connect road users that are related to each other. A road user "A" is defined as being related to another road user "B", if the z-level of the current position of user/object "A" crosses the trajectory of road user/object "B". In other words, two road users are related to each other if one object is at a depth the other object has already been in the past, i.e. has already been detected in the past by, e.g., the ranging system of the ego-vehicle. As an alternative to determining a purely lateral distance or x-distance, any other (minimum) distance prescription between the current position of an object and a trajectory of another object can be computed, e.g. an Euclidean distance.

Referring to the specific example situation depicted in FIG. 5A, the road user with id:410 is currently at a depth of 25 meters (m). Therefore, road user 410 is related to the road users 500 and 502 because the trajectories of id:500 and id:502 reach back to the depth of 25 m. In contrast, road user with id:506 is not related to user 410 because the trajectory of detected moving object 506 reaches back only to a depth of 45 m. These relationships are represented or mirrored in the graph structure: There is a link from node 410 to node 500 and node 502, but no link from node 410 to node 506.

Once the graph as shown in the left portion of FIG. 5A is set up, the inference to achieve lane assignments can be done. Assigned lanes are depicted in the boxes at the top right of each node in the relation graph of FIG. 5A. The inference process may start with the ego-vehicle id:0, but any other starting point may also be used. First, the ego-vehicle 0 is assigned arbitrarily to lane 0. Then, for all links or relations in the graph, the x-distance (alternatively another distance measure such as an Euclidean distance) between the two related or linked objects or road users is determined, i.e. the distance between the current position of one road user and the trajectory of the other road user. These distances are indicated with double-arrows in the radar plot of FIG. 5A (left portion).

If the distance determined as before is below a specific threshold, the two related road users are supposed to be on one and the same lane. For example, the trajectory of road user 500 has a small x-distance only to the current position of the ego-vehicle 0 at z=0. Therefore it is decided that road user with id:500 is on the same lane as the ego-vehicle 0, i.e. both are assigned to lane 0 (see right portion of FIG. 5A). The trajectory of road user 410, on the other hand, has a large x-distance to the ego-vehicle 0 at the current position of the ego-vehicle at z=0, and it is decided that object 410 is on another lane. Specifically, road user 410 is located to the right of the ego-vehicle 0. Hence, object 410 is assigned to the lane right to lane 0, i.e. lane 1 (in case of a prescription defining ego-lane=0, lane right to ego-lane=1, lane left to ego-lane=−1, etc.).

The inference as outlined above may scan all nodes and relations of the relation graph until all nodes (road users, detected moving objects) have been assigned a lane label (lane identifier or lane index). Specifically, such scan may follow a scheme such as depth-first-search or breath-first-search.

FIG. 5B depicts another exemplary scenario to more specifically illustrate a determination and usage of the relations between the moving objects for inferring lane assignments.

In an (x,z) coordinate system of the ego-vehicle ID:0, dashed lines 542, 544, 546, 548 indicate forward distances for the ego-vehicle (assumed to be at z=0) and detected moving objects with IDs 502, 600, and 500, respectively. Trajectories 552, 554, and 556 of objects 502, 600 and 500, respectively, are assumed to be represented in the assistance system of the ego-vehicle. A relation graph representing relations between the ego-vehicle and the detected objects is indicated with arrows 562, 564, 566.

For determining the relation graph, a loop is performed over all objects including the ego-vehicle. For each object under consideration, it is determined which of the trajectories stored in the system are relevant. A trajectory may be considered relevant if it is available at the current forward distance of the object under consideration (for the ego-vehicle, the current forward distance is z=0). In terms of the illustration in FIG. 5B, a trajectory may be considered relevant if it intersects with the horizontal dashed line (constant z value) associated with the object under consideration. If a particular trajectory intersects, the object under consideration currently passes a point (more precisely, a line perpendicular to the driving direction) where the moving object, to which the trajectory is assigned to, has been in the past.

Referring to the specific example depicted in FIG. 5B, the ego-vehicle ID:0 is currently at a point where ID:502 has been in the past, because the z-line 542 of ID:0 intersects with the trajectory 552 of object 502. However, the ego-vehicle ID:0 has no intersection with either ID:500 or ID:600. Therefore, the ego-vehicle ID:0 is represented in the relation graph as having a relation 562 with ID:502, but no further relations to the other two objects is stored. Further, ID:502 has a relation 564 to ID:600 and ID:600 has a relation 566 to ID:500.

After the relation graph has been determined, a lane assignment procedure may be propagated along the relations represented in the graph. Specifically, as there is a relation established between ID:0 and ID:502, a distance d_1 is determined. As the distance d_1 is determined to be above a threshold (e.g., a lane width), it is concluded that a lane identifier '1' is to be assigned to ID:502, which is an assignment performed relative to an initial (arbitrary) lane assignment of identifier '0' (ego-lane) to the ego-vehicle. No distance determination is attempted for ID:500 or ID:600, as no relation of the ego-vehicle to one or both of these objects is represented in the graph. By propagating further the relation graph, based on determining the distance d_2, a lane identifier '−1' is assigned to ID:600, and based on determining the distance d_3, a lane identifier '0' is assigned to ID:500.

The simple example of FIG. 5B illustrates a specific method of achieving a consistent lane assignment pattern to the detected moving objects. Based on the relations as represented in the relation graph, a propagation path is followed along the graph, starting from the ego-vehicle with an arbitrary initial lane assignment. Along the propagation path, also the lane assignments are propagated, i.e. a lane assignment of a first object under consideration is propagated to a second object having an intersecting trajectory with the z-distance of the first object, wherein the lane assignment of the second object is the lane assignment of the first object updated by the result of the distance determination between the first object and the intersecting trajectory.

Referring again to FIGS. 2 and 3 and returning thereby to the specific functional blocks of ECU 130 of vehicle 110 and the operation thereof, relation determining component 208 may operate to determine a relation list similar to that shown in FIG. 5, right portion, for the current traffic situation as depicted in FIG. 1, i.e. component 208 determines relations between objects 120, 122, 124 and the ego-vehicle 110 and stores the generated or updated current relation list in storage 210.

Then, component 208 triggers a functional loop component 212 which is provided to work along the nodes and links of the stored relation graph according to a prescribed algorithm, for example according to a depth-first-search or breath-first-search scheme. As such schemes are known as such to the person of skill, further details are omitted in this respect. However, with reference to some specific aspects of the scan performed by component 212, functional components 214 and 216 are illustrated in FIG. 2.

Component 214 is adapted to select in step 308 one first object from the one or more detected moving objects 120, 122 and 124 as represented in storages 206 and 210 and the ego-vehicle 110. Component 216 is adapted to select in step 310 a second object from the one or more moving objects represented in components 206 and 210, wherein the second object is different from the first object currently selected by component 214.

Functional calculation components 220 and 222 are provided, wherein distance component 220 is adapted to determine in step 312 a distance between a current position of the first object currently selected by component 214 and the trajectory of the second object currently selected by component 216. Discrimination component 222 is amongst others adapted to compare in step 314 the distance determined by component 220 with a predefined threshold stored in a further storage component 224 which is associated with ECU 130 and may provide various fixed, permanent and/or semipermanent data provided at a time of manufacture of the vehicle 110 and/or updated by service personnel during inspection.

Lane assignments indicating a lane to which one of the stored objects or the ego-vehicle is assigned are illustrated as being stored in a separate storage component 218 in FIG. 2 for reasons of discussion. In practice such lane assignments may be stored in association to the trajectory data in storage 206 (which may also be structured according to objects or identifiers) and/or the relation graph data in storage 210; in one implementation, the relation lists of storage 210 may also be stored in conjunction with the data records and the lane assignments stored in storage 206. In any case, i.e. also in case of extra storage as in the embodiment of FIG. 2, the lane assignments require storage in association to the ids of the detected objects and the ego-vehicle.

Based on results provided by loop component 212, an assignment component 226 is adapted to provide (step 316), i.e. generate or update, lane assignments, wherein each assignment comprises an association (data pair) of an object id and a lane label. To this end, the component 226 accesses assignment storage 218 and provides a new or updated lane assignment for the currently selected second object relative to an existing lane assignment of the currently selected first object as retrieved from storage 218. For example, in case the determined distance is below the threshold, the same lane as indicated by the retrieved lane assignment is assigned to the second object. In case the determined distance is above the threshold, a lateral position of the currently selected second object is determined relative to the ego-vehicle. The new or updated lane assignment then indicates a lane to the left or right of the lane to which the ego-vehicle is assigned.

Generally, a relative lane assignment procedure as described here may start with assigning a predefined lane label to the lane of the ego-vehicle, e.g. the lane assignment of the ego-vehicle may be prescribed as a starting point or permanently as assigning the ego-vehicle with id "0" to lane label "0".

The component 226 may store the new or updated lane assignment in storage 218 and may return control to the loop component 212. In case further second objects have to be scanned (decision 318), the component 216 is activated; in case further first objects are to be scanned (decision 320), the component 214 is activated. Generally, the first objects to be scanned comprise all nodes in the relation graph currently stored in storage 210 including the ego-vehicle. For each first object, the second objects to be scanned or looped through comprise the detected objects related to the first object as represented in the relation graph in storage 210.

In case the scan over the relation graph stored in storage 210 has been finished, control is handed over to a conflict resolving component 228. Before describing in detail the operation thereof, FIGS. 6 to 9 are referred to for a high-level discussion of corrections which may have to be applied to a set of lane assignments as generated by a single, first scan over a relation graph.

It is to be understood that generally multiple lane assignments are generated for one and the same detected moving object, i.e. object id, because the object in general can be related to multiple other objects. As an example, in FIG. 5, object 410 is related to objects 500 and 502, as their trajectories cross the current depth of object 410. Consequently, two lane assignments will be generated, both consistently assigning a lane right to the lane of objects 500 and 502 to object 410.

However, inconsistencies can occur in the lane assignments, for example because a road user may perform a lane change during a time span at least partly covered by the trajectory of that object maintained in the ego-vehicle. In case of a completed lane change, the trajectory may touch two (or even more) lanes. In case of an ongoing lane change or a lane change partly represented in the trajectory, no consistent assignment of the lane-changing object to a lane may be found.

FIG. 6 illustrates an exemplary situation in this respect, wherein the presentation is similar to FIG. 5 in that the left portion of FIG. 6 represents a radar plot with positions and position histories (trajectories) for various detected objects, while the right portion illustrates a corresponding relation graph as may be generated from the situation depicted in the left portion.

FIG. 6 concerns a situation wherein road user 502 changes from a left lane (e.g., lane 0, i.e. the ego-lane of the ego-vehicle 0) to a right lane (e.g., lane 1, i.e. the lane to the right of lane 0). Specifically, the trajectory of id 502 is assigned to lane 0 in the past and may be assigned to lane 1 at the current time point, as the object 502 is about to change to lane 1.

As a result, lane assignments for object 502 based on its relations to objects 410 and 500 assign lane 0 to object 502, while a lane assignment for object 502 based on its relation to object 506 assigns lane 1 to object 502. The reason for the conflicting assignments is that road user 502 is currently about to be on the same lane as road user 506, but was left of road user 410 in the past, while road users 410 and 506 are currently on the same lane. The resulting conflicting assignments are indicated in the relation graph in the right portion of FIG. 6 for object 502.

Various approaches can be contemplated to resolve inconsistencies or conflicts such as that depicted in FIG. 6. The embodiment which will be discussed in the following comprises of two steps: First, all nodes that may be responsible for the conflict are identified. Second, an appropriate conflict handling is applied, as described in the following.

While conflicting assignments often result from a lane change, this does not necessarily imply that the lane change is or has been performed by the node (object) with the conflicting assignments. In fact, besides the conflicting node itself, one or more of all those nodes which are related to the conflicting node, i.e. for which there is a path to the conflicting node, can be responsible for the conflict.

FIG. 7 depicts in its left portion an example situation which is more complex than that of FIG. 6, and which will be referred to for reasons of discussion. It is assumed that conflicting lane assignments are detected for node 602. The right portion of FIG. 7 depicts those nodes of the relation graph with dashed lines that cannot be the reason for the conflict, because there is no path from these nodes to node 602. This is true for the nodes 598 and 599.

As the other nodes 0, 601, 609, 610 and 602 are related directly or indirectly to the conflicting node 602, one or more of these nodes might have caused the conflict.

In case node 0 (ego-vehicle) is used as a basis for relative lane assignment, node 0 cannot be the reason for the conflict. However, node 0 would have to be considered, for example, in implementations in which trajectories may extend behind the current position of the ego-vehicle, i.e. if trajectories are prolonged into the negative z region below the ego-vehicle in x-z plots similar to those of the preceding figures herein.

In order to resolve the conflict and to identify the node which is responsible for the conflict in the relation graph of FIG. 7, for each potential conflict node a new graph may be generated, in which the potential conflict node is removed.

FIG. 8 shows the graphs resulting from removing a respective one of the potential conflict nodes 602, 601, 609, and 610 from the example graph of FIG. 7.

According to the top right graph in FIG. 8, when removing node 601 from the relation graph, the conflict continues to be present. As the conflict remains when removing node 601, it is to be decided that node or object 601 cannot be the reason for the conflict.

The further graphs of FIG. 8 show that removing any one of nodes 609, 610 and 602 results in the conflict disappearing, i.e. one of these nodes is the reason for the conflict.

At this point, either additional information or a reasonable assumption is required as input for the system to identify the node or object responsible for the conflict. Information may be provided by, e.g., by a lane detection device such as a camera. As another approach, additional information can be gathered from a ranging system, preferably the system which provides data on detected objects. For example, additional lane shape or road course information may be extracted from objects which are detected by a radar system and classified as static and dynamic (moving) objects.

One or more suitable assumptions may additionally or alternatively be provided to the system. As but one example, from among multiple nodes potentially responsible for a conflict, the node having the least number of connections (relations) in the graph may be selected as the conflict-resolving node. The basis for the approach can be seen in that the least information about its relative position is available for the selected node, i.e. the probability for an error in relative lane assignment is highest for that node.

In the example of FIGS. 7 and 8, node 609 has four relations, node 602 has three relations, and node 610 has two relations. Therefore following the above assumption node 610 may be removed from the relation graph. The graph as shown in the lower right of FIG. 8 will therefore form the basis for the further determination.

FIG. 9 illustrates the result of the conflict resolving procedure: While node 610 has been removed from the graph and will be left without any lane assignment, the lane assignments for the other nodes or objects are determined without reference to node 610, and therefore a consistent set of lane assignments can be determined for all nodes except node 610.

Other or further assumptions for resolving inconsistencies or conflicts in the lane assignments may be implemented or applied, for example, dependent on the driving assistant function relying upon the lane assignments. As an example, in situations in which lane changes can be expected to happen rarely, the system may decide to simply wait for the conflict to resolve and disappear within the next few seconds. Such simple approach may be desired sufficient for comfort functions such as lane change assistants which are not time-critical.

As another example, from among multiple nodes potentially responsible for a conflict, the node or nodes being nearest in depth (e.g., z-distance, forward distance) to the conflicting node may be kept in the graph while removing the potential conflict-causing node having the largest z-distance to the conflicting node from the graph. The rationale is that decisions may be decided less reliable when based on relations assumed over a longer timescale and more reliable when based on short-term relations.

Different assumptions may be applied for conflict resolution and/or multiple assumptions may be applied to arrive at a reliable decision on conflicting lane assignments. In case of multiple conflicts one or more of the above-described procedures may be applied multiple times until any conflict is removed from a relation graph. While the nodes or objects removed from the graph will have no lane assignments, all remaining nodes will have consistent lane assignments.

Referring back to ECU 130 in FIG. 2, the conflict resolving component 228 operates in step 322 to detect and resolve one or more conflicts in the current lane assignments as stored in storage 218. To this end, component 228 is adapted to compare multiple lane assignments available in storage 218 for one and the same object identifier. Based on a result of the comparison, in case of a conflicting lane assignment the component performs a conflict resolution process as has been discussed exemplarily above.

Process 300 ends (324) as soon as a set of consistent lane assignments is available for a maximum of the detected moving objects. The corresponding data may be made available to other components of the ECU 130 or vehicle 110 as indicated by arrow 230 in FIG. 2. For example, the data including the lane assignments and the total number of detected lanes may be indicated to one or more ADAS functions, and/or may be provided for an output on, e.g., a display of the ego-vehicle. The data may also be provided to other moving objects nearby based on, e.g., a Car2X environment, which may contribute to generating reliable processing results.

While in the examples above lane assignments have been performed for moving objects detected in front of the ego-vehicle, i.e. in a forward direction (direction of travel) of the ego-vehicle, embodiments of the invention are also applicable for additionally or alternatively assign lanes to traffic behind the ego-vehicle, i.e. in a backward direction (direction opposite to the direction of travel) of the ego-vehicle. For example, trajectories (position histories) can be continuously traced even if the ego-vehicle passes by earlier positions of detected moving objects.

Trajectories may even be set up entirely behind the ego-vehicle. Distances between current positions and trajectories can also be determined in a backward direction of the ego-vehicle. Corresponding lane assignments may be of value for functions such as lane change assistants, braking assistants, cruise control, etc.

As the inventive technique does not depend on lane markings, lane assignments can also be performed in areas of fuzzy markings or where markings are obscured, e.g. in road construction areas, or when markings are obscured by snow or ice.

While the invention has been described in relation to its preferred embodiments, it is to be understood that this description is intended non-limiting and for illustrative purposes only. In particular, various combinations of features which have been described separately hereinbefore are apparent as advantageous or appropriate to the skilled artisan. Accordingly, it is intended that the invention be limited only by the scope of the claims appended hereto.

The invention claimed is:

1. A method of lane assignment in a vehicle, comprising the steps of:

providing, by an electronic control unit of the vehicle, one or more trajectories, wherein each trajectory represents a time sequence of positions of a moving object;

selecting, by the electronic control unit of the vehicle, one first object from the one or more moving objects and the vehicle, wherein a first lane assignment indicates a lane to which the first object is assigned;

selecting, by the electronic control unit of the vehicle, one second object from the one or more moving objects;

determining, by the electronic control unit of the vehicle, a distance between a current position of the first object and the trajectory of the second object;

comparing, by the electronic control unit of the vehicle, the distance with a predefined threshold;

providing, based on the first lane assignment and a result of the comparison, and by the electronic control unit of the vehicle, a second lane assignment indicating a lane to which the second object is assigned;

building, by the electronic control unit of the vehicle, a relation graph representing relations between pairs of moving objects, including determining trajectories which have to be considered for building the relation graph, wherein a trajectory of a second object has to be considered if a distance between this trajectory and the trajectory of a first object is below a pre-determined threshold, and a relation between the first and the second object is defined if the trajectory has to be considered; and propagating, by the electronic control unit of the vehicle, lane assignments along the determined relation graph, including determining distances (d-1, d-2, d-3) between pairs of moving objects having a relation with each other, and inferring lane assignments for the moving objects by assigning a lane to a second object of a pair of moving objects according to a lane assignment for the first object of the pair of moving objects and the determined distance for that pair of moving objects.

2. The method according to claim 1, comprising the further step of accepting object data indicating one or more object positions as detected by a ranging system of the vehicle and/or provided by a Car2X environment.

3. The method according to claim 1, wherein the step of determining the distance comprises determining at least one of a lateral distance and an Euclidian distance between a current position of the first object and the trajectory of the second object.

4. The method according to claim 1, wherein the predefined threshold represents at least one of a lane width and a vehicle width.

5. The method according to claim 1, wherein the second lane assignment is provided to indicate, in case the determined distance is below the threshold, the same lane as indicated by the first lane assignment.

6. The method according to claim 1, comprising, in case the determined distance is above the threshold, the further steps of determining a lateral position of the second object relative to the vehicle, and providing the second lane assignment to indicate a lane to the left or right of the lane to which the vehicle is assigned.

7. The method according to claim 1, wherein a lane assignment indicates a lane based on a position of the lane relative to another lane.

8. The method according to claim 1, comprising the further steps of determining a current forward distance of the first object from the vehicle; and determining trajectories available at the determined current forward distance;

wherein the step of selecting the second object comprises selecting an object associated with one of the determined available trajectories.

9. The method according to claim 1, wherein a trajectory has to be considered for building the relation graph if a line projected perpendicular to the driving direction of a first object at a current position of a first object intersects with a trajectory of a second object.

10. The method according to claim 1, comprising the further steps of
comparing multiple lane assignments for one and the same object; and
selectively performing a conflict resolution process based on a result of the comparison indicating conflicting lane assignments.

11. The method according to claim 10,
wherein the step of selecting one second object from the one or more moving objects comprises determining a relation list indicating objects with available trajectories for each of the one or more moving objects and the vehicle; and
wherein the conflict resolution process comprises the steps of:
providing a modified relation list by removing one object from the object with the conflicting lane assignments and the objects related to the object with the conflicting lane assignments from the relation list; and
re-determining the lane assignments based on the modified relation list.

12. The method according to claim 11, wherein a related object with the least number of relations is removed from the relation list.

13. The method according to claim 1, wherein first and/or second objects are selected in a depth-first-search or breath-first-search.

14. A computer program, embodied on a non-transitory computer readable medium, the computer program, when executed by a processor, causes the processor to:
provide one or more trajectories, wherein each trajectory represents a time sequence of positions of a moving object;
select one first object from the one or more moving objects and the vehicle, wherein a first lane assignment indicates a lane to which the first object is assigned;
select one second object from the one or more moving objects;
determine a distance between a current position of the first object and the trajectory of the second object;
compare the distance with a predefined threshold;
provide, based on the first lane assignment and a result of the comparison, a second lane assignment indicating a lane to which the second object is assigned;
build a relation graph representing relations between pairs of moving objects, including
determining trajectories which have to be considered for building the relation graph, wherein a trajectory of a second object has to be considered if a distance between this trajectory and the trajectory of a first object is below a pre-determined threshold, and a relation between the first and the second object is defined if the trajectory has to be considered; and
propagate lane assignments along the determined relation graph, including
determining distances (d-1, d-2, d-3) between pairs of moving objects having a relation with each other, and
inferring lane assignments for the moving objects by assigning a lane to a second object of a pair of moving objects according to a lane assignment for the first object of the pair of moving objects and the determined distance for that pair of moving objects.

15. A system for assisting a driver in a vehicle, comprising:
a radar system; and
an electronic control unit,
wherein the electronic control unit is configured to
provide one or more trajectories, wherein each trajectory represents a time sequence of positions of a moving object;
select one first object from the one or more moving objects and the vehicle, wherein a first lane assignment indicates a lane to which the first object is assigned;
select one second object from the one or more moving objects;
determine a distance between a current position of the first object and the trajectory of the second object;
compare the distance with a predefined threshold;
provide, based on the first lane assignment and a result of the comparison, a second lane assignment indicating a lane to which the second object is assigned;
build a relation graph representing relations between pairs of moving objects by
determining trajectories which have to be considered for building the relation graph, wherein a trajectory of a second object has to be considered if a distance between this trajectory and the trajectory of a first object is below a pre-determined threshold, and a relation between the first and the second object is defined if the trajectory has to be considered; and
propagate lane assignments along the determined relation graph by
determining distances (d-1, d-2, d-3) between pairs of moving objects having a relation with each other, and
inferring lane assignments for the moving objects by assigning a lane to a second object of a pair of moving objects according to a lane assignment for the first object of the pair of moving objects and the determined distance for that pair of moving objects.

16. A vehicle, comprising:
an electronic control unit configured to
provide one or more trajectories, wherein each trajectory represents a time sequence of positions of a moving object;
select one first object from the one or more moving objects and the vehicle, wherein a first lane assignment indicates a lane to which the first object is assigned;
select one second object from the one or more moving objects;
determine a distance between a current position of the first object and the trajectory of the second object;
compare the distance with a predefined threshold;
provide, based on the first lane assignment and a result of the comparison, a second lane assignment indicating a lane to which the second object is assigned;
build a relation graph representing relations between pairs of moving objects by
determining trajectories which have to be considered for building the relation graph, wherein a trajectory of a second object has to be considered if a distance between this trajectory and the trajectory of a first object is below a pre-determined threshold, and a relation between the first and the second object is defined if the trajectory has to be considered; and
propagate lane assignments along the determined relation graph by determining distances (d-1, d-2, d-3) between pairs of moving objects having a relation with each other, and inferring lane assignments for the moving objects by assigning a lane to a second object of a pair of moving objects according to a lane assignment for the first object of the pair of moving objects and the determined distance for that pair of moving objects.

* * * * *